(12) United States Patent
Weber et al.

(10) Patent No.: US 9,579,874 B2
(45) Date of Patent: Feb. 28, 2017

(54) METHOD OF PRODUCING A REFLECTION TRANSFER FOR TRANSFERRING A MOTIF ONTO A SUBSTRATE

(71) Applicants: Holger Weber, London (GB); Harald Kaufmann, Hattingen (GB)

(72) Inventors: Holger Weber, London (GB); Harald Kaufmann, Hattingen (GB)

(*) Notice: Subject to any disclaimer, the term of this patent is extended or adjusted under 35 U.S.C. 154(b) by 313 days.

(21) Appl. No.: 14/042,809

(22) Filed: Oct. 1, 2013

(65) Prior Publication Data
US 2014/0099483 A1 Apr. 10, 2014

Related U.S. Application Data

(60) Provisional application No. 61/710,039, filed on Oct. 5, 2012.

(30) Foreign Application Priority Data

Oct. 5, 2012 (EP) .................................. 12187461

(51) Int. Cl.
 B32B 38/00 (2006.01)
 B44C 1/17 (2006.01)
 (Continued)

(52) U.S. Cl.
 CPC .............. *B32B 38/145* (2013.01); *B32B 3/10* (2013.01); *B32B 37/025* (2013.01); *B44C 1/1725* (2013.01); *B44C 1/1745* (2013.01); *B44F 1/02* (2013.01); *D06Q 1/00* (2013.01); *D06Q 1/12* (2013.01); *Y10T 428/2481* (2015.01); *Y10T 428/24893* (2015.01)

(58) Field of Classification Search
 CPC ....... B32B 37/025; B32B 38/145; B32B 3/10; B44C 1/1725; B44C 1/1745; B44F 1/02; Y10T 428/2481; Y10T 428/24893
 USPC ...... 428/196, 206, 207, 32.15, 32.24, 32.34, 428/32.37, 32.69, 32.74, 32.77, 40.1, 428/41.2, 343, 354, 542.6, 914; 156/249, 156/277, 93; 101/129
 See application file for complete search history.

(56) References Cited

U.S. PATENT DOCUMENTS

| | | | |
|---|---|---|---|
| 2,354,049 | A | 7/1944 | Palmquist |
| 2,403,752 | A | 7/1946 | Phillippl |

(Continued)

FOREIGN PATENT DOCUMENTS

| | | |
|---|---|---|
| AT | 200691 | 11/1958 |
| DE | 1446828 A1 | 2/1969 |

(Continued)

OTHER PUBLICATIONS

Extended European Search Report for EP12187461.4 dated Mar. 8, 2013.

(Continued)

*Primary Examiner* — Arti Singh-Pandey
(74) *Attorney, Agent, or Firm* — Cahn & Samuels, LLP

(57) ABSTRACT

A method of producing a reflection transfer for transferring a motif onto a substrate includes providing an adhesive-repellent base medium, applying a transfer adhesive to the base medium, creating a colored print image by offset printing or digital printing, and applying at least one reflection layer which contains a multiplicity of reflection particles.

17 Claims, 19 Drawing Sheets

(51) Int. Cl.
*B44F 1/02* (2006.01)
*B32B 3/10* (2006.01)
*B32B 37/00* (2006.01)
*D06Q 1/00* (2006.01)
*D06Q 1/12* (2006.01)

(56) References Cited

U.S. PATENT DOCUMENTS

| | | | |
|---|---|---|---|
| 3,165,153 | A | 1/1965 | Lanmon |
| 3,172,942 | A | 3/1965 | Berg |
| 3,420,597 | A | 1/1969 | Schoonover et al. |
| 3,700,305 | A | 10/1972 | Bingham |
| 3,971,692 | A | 7/1976 | Anderson |
| 4,427,472 | A | 1/1984 | Trager |
| 4,517,237 | A | 5/1985 | Pernicano |
| 4,657,803 | A | 4/1987 | Pericano |
| 4,664,735 | A | 5/1987 | Pernicano |
| 4,849,265 | A | 7/1989 | Ueda et al. |
| 4,902,670 | A | 2/1990 | Kanto et al. |
| 4,939,674 | A | 7/1990 | Price et al. |
| 5,200,268 | A | 4/1993 | Hamada |
| 5,300,169 | A | 4/1994 | Tahara |
| 5,306,374 | A | 4/1994 | Hambright |
| 5,358,281 | A | 10/1994 | Greig |
| 5,503,906 | A | 4/1996 | Olsen |
| 5,620,775 | A | 4/1997 | LaPerre |
| 5,621,993 | A | 4/1997 | Stover |
| 5,631,064 | A | 5/1997 | Marecki |
| 5,633,836 | A | 5/1997 | Langer et al. |
| 5,674,605 | A | 10/1997 | Marecki |
| 5,837,347 | A | 11/1998 | Marecki |
| 5,945,201 | A | 8/1999 | Holat |
| 6,060,157 | A | 5/2000 | LaPerre et al. |
| 6,155,189 | A | 12/2000 | Walner |
| 6,194,044 | B1 | 2/2001 | Stahl |
| 6,277,229 | B1 | 8/2001 | Popat et al. |
| 6,372,341 | B1 | 4/2002 | Jung et al. |
| 6,465,071 | B1 | 10/2002 | Satoh et al. |
| 6,667,095 | B2 | 12/2003 | Wheatley et al. |
| 7,946,226 | B1 * | 5/2011 | Kaufmann ............... B41M 1/12 101/491 |
| 8,418,616 | B2 | 4/2013 | Kaufmann |
| 2003/0054139 | A1 * | 3/2003 | Ylitalo ................ B41M 5/0011 428/195.1 |
| 2010/0297383 | A1 | 11/2010 | Aoyama |
| 2012/0298025 | A1 | 11/2012 | Kaufmann |

FOREIGN PATENT DOCUMENTS

| | | |
|---|---|---|
| DE | 102010001511 A1 | 8/2011 |
| EP | 0 503 738 | 9/1992 |
| EP | 1137546 B1 | 10/2001 |
| EP | 1137546 B1 | 9/2003 |
| GB | 867783 A | 5/1961 |
| GB | 1 273 895 | 5/1972 |
| JP | 04096041 | 3/1992 |
| JP | 04164647 | 6/1992 |
| JP | 04296838 | 10/1992 |
| JP | 05273652 | 10/1993 |
| JP | 05273655 | 10/1993 |
| JP | 08152684 A | 6/1996 |
| WO | 2009090765 A1 | 7/2009 |

OTHER PUBLICATIONS

English abstract of EP1137546 (A1).
English abstract of DE102010001511 (A1).
English Abstract of WO 2009090765.
English Abstract of JP 04096041.
English Abstract of JP 04296838.
English Abstract of JP 05273652.
English Abstract of EP 0 503 738.
English Abstract of JP 04164647.
English Abstract of JP 05273655.
English Abstract of JP 08152684.

* cited by examiner

Carrier Sheet Design C

Carrier Sheet Design A

FIG. 8A
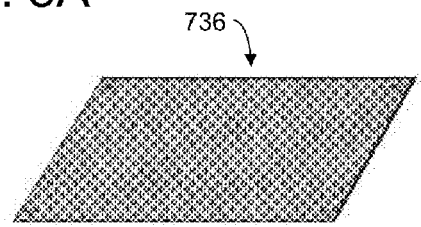
Example: Carrier Sheet Design A
with all-over Reflection
and partial Glitter
FIG. 8B
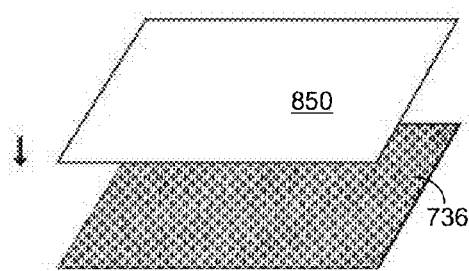
FIG. 8C          FIG. 8D          FIG. 8E
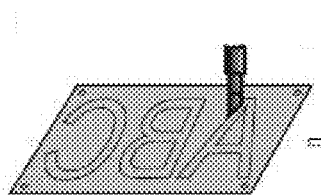  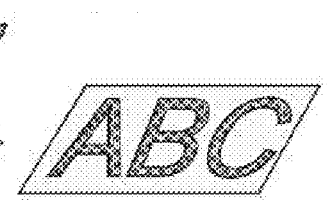

Example: Carrier Sheet Design A
with all-over Reflection
and partial Glitter

Use of Plotter or Laser

Example: Carrier Sheet Design A
with all-over Reflection
and partial Glitter

Foil has to be removed from
Carrier Sheet before stitching before the Offset/Digital Print:

All-over printed base layers

Partially printed base layers

The various printed Designs are sorted and stacked

Sheets with partially printed Screenprint and all-over printed Offset / Digital Print in various Designs Sheets with all-over printed Screenprint and all-over printed Offset / Digital Print in various Designs

FIG. 11E
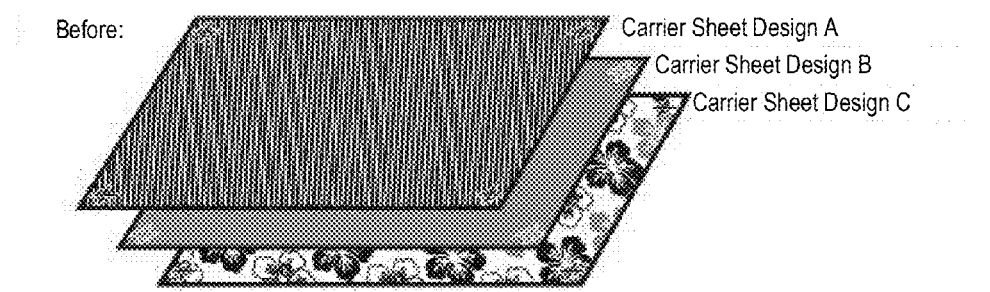
FIG. 11F
FIG. 11G
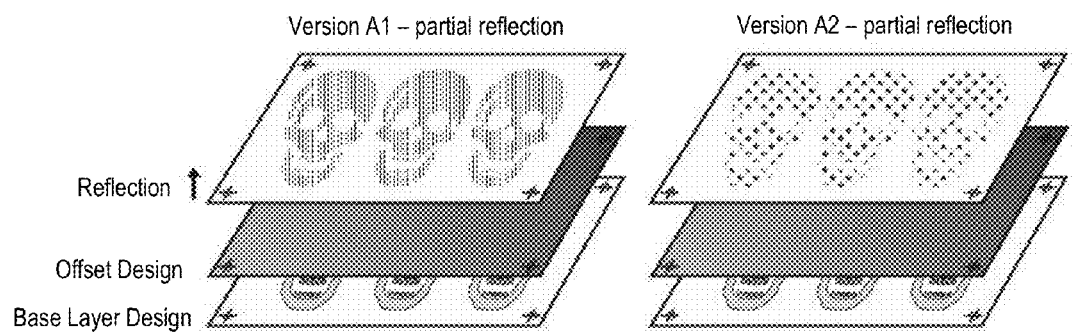
FIG. 11H
FIG. 11I
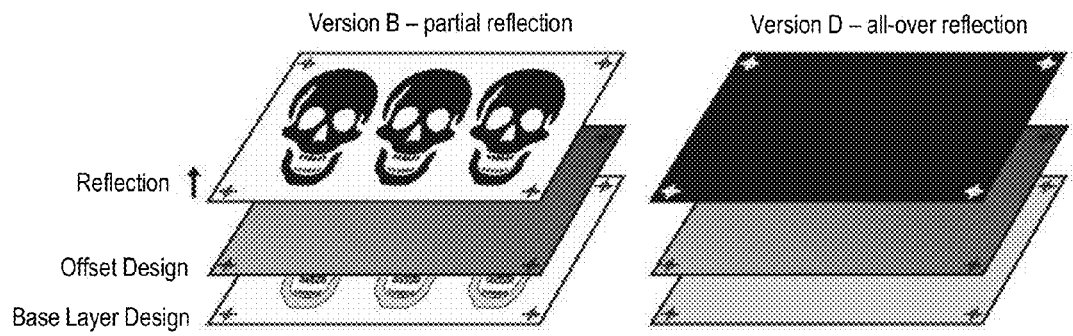

METHOD OF PRODUCING A REFLECTION TRANSFER FOR TRANSFERRING A MOTIF ONTO A SUBSTRATE

This application claims priority to U.S. Ser. No. 61/710,039 filed in the U.S. Patent and Trademark Office on Oct. 5, 2012, the entirety of which is incorporated herein by reference. This application also claims priority to European patent application 12187461.4 filed on Oct. 5, 2012, the entirety of which is incorporated herein by reference.

FIELD OF INVENTION

The invention concerns a method of producing a reflection transfer for transferring a motif onto a substrate. The invention further concerns a reflection transfer and a textile product.

BACKGROUND OF INVENTION

DE 1 446 828 A1 discloses a reflecting transfer film and a process for the production of reflex-reflecting articles, for example for marking articles of clothing. The transfer film has a transfer layer comprising an adhesive layer, a rubber-like bonding agent layer disposed thereon, with incorporated, partly protruding microballs, and a strippable protective layer on the adhesive side of the transfer layer. On its front side the transfer layer has a dimensionally stable carrier substrate which can be stripped off dry after being glued on. For transfer onto an article of clothing a hot iron is firmly pressed onto the carrier substrate of the structure and then the carrier substrate is stripped off the reflex-reflecting transfer film. To apply markings of different kinds of shapes the respective motifs are firstly cut out and then applied to the subjacent article of clothing or fabric.

Furthermore, it is also generally known in the art that offset printing principally provides the option of extremely high production rates (which may e.g. amount up to 20.000 sheets per hour), if compared e.g. to a screen print process. However, in attempts to apply the technology of offset printing to the production of transfer films a problem that arises in practice is that the realistic total throughput in production is strongly limited by the time that is needed for the necessary application of a (typically white) intermediate layer—usually in a screen print process—onto the colored print image created in a mirror image relationship in the offset printing machine within a strictly predetermined time window of typically 24-48 hours. Otherwise, if the (typically white) intermediate layer is printed too early (in less than 24 h), the offset colorants in the colored print image are not sufficiently dried and therefore not wipe-resistant and not washing-resistant. If the intermediate layer is applied too late (after more than 48 h), problems may occur during the later transfer applying process since the offset colorants have oxidized completely, which may lead to their sticking to the transfer paper. The afore-described limitation to the total manufacturing process leads to small production rates (which may typically be in the order of magnitude of e.g. 500-800 sheets per hour), which are further reduced if additional layers are printed.

As further prior art, reference is exemplarily made to EP 1 137 546 B1.

SUMMARY OF INVENTION

It is an object of the present invention to provide a method of producing a reflection transfer for transferring a motif onto a substrate, which enables a fast, economic and large-scale production of transfers that also provide attractive reflection properties.

That object is attained by the method having the features of independent claim 1.

A method of producing a reflection transfer for transferring a motif onto a substrate according to the invention comprises the following steps:

providing an adhesive-repellent base medium;
applying a transfer adhesive to the base medium;
creating a colored print image by means of offset printing or digital printing; and
applying at least one reflection layer which contains a multiplicity of reflection particles.

The fact that application of the colored print image to the transfer adhesive (or to an optional primer on said transfer adhesive, as will be described below in more detail) is performed by means of offset printing or digital printing subsequent to the application of the transfer adhesive to the base medium (which can in particular be performed in forming a motif and using a screen printing process) results in a very significant increase in productivity. This increase in productivity is achieved in particular due to the possibility of producing—in advance and before creating the colored print image in the offset printing or digital printing process as further described below—a plurality of sheets for storage, each of which already having the transfer adhesive (with optional primer) applied to the base medium, wherein said sheets are afterwards dried and stored and can then be delivered, at the desired time and in the order and frequency as desired, e.g. to the offset printing machine for applying the respective colorants. This production of a plurality of sheets for storage enables to make maximum use of the relatively high production speed that is basically made possible for the subsequent step of applying the intermediate product (comprising on the base medium already the adhesive layer as well as optionally the primer/intermediate layer) into an offset printing or digital printing machine.

The invention in particular takes account of the circumstance that, although use of e.g. an offset printing machine principally provides the option of extremely high production rates (which may e.g. amount to 20.000 sheets per hour), the realistic total throughput in a conventional production of a transfer film is strongly limited by the time that is needed for applying—usually in a screen print process—the required white layers onto the colored print image that had been initially produced on a base medium in the offset printing machine within a strictly predetermined time window of typically 24-48 hours, ultimately leading to the result that, in the conventional process, only a relatively small production rate in the order of magnitude of e.g. 500-800 sheets per hour could be really processed further by applying said white layers.

In contrast to this, and also as a consequence of the fact that the layer order in the method according to the invention is inverted with respect to a conventional transfer film production such as e.g. disclosed in DE 1 446 828 A1 or with respect to processes that involve a mirror-reversed application of colorants on a transfer medium, the inventive order of layer application steps makes it possible to shift the relatively time-consuming part (e.g. the production of a layer sequence "(1) base medium—(2) transfer adhesive (with optional primer)" that incorporates a screen print process to the beginning of the total manufacturing process, thereby enabling a storage production of large numbers (e.g. 10.000) sheets, which can be dried and stored (even if desired for several weeks) in order to afterwards take maximum benefit of the production capacities of the offset printing machine.

Furthermore, it is to be pronounced in this context that the procedure according to the invention, in production of the reflection transfer film, provides that the reflection properties are substantially improved by virtue of the fact that firstly the procedure begins with the adhesive-repellent base medium that is afterwards provided with a transfer adhesive, the colored print image and—only then—with reflection layer, in comparison with a conventional method in which firstly the colorant and then the adhesive are applied to a transfer carrier and a motif is firstly applied by printing to the transfer carrier in mirror-reversed relationship, as, in contrast to the rather unified appearance which is achieved with the conventional approach, the reflection particles are raised above the dried reflective layer. The material produced in that way is particularly excellently well suited to being refined and improved with further printing inks/effects so that highly effective and personalized films can be produced. In that respect it is possible to make use of the fact that, with the reflection transfer film used according to the invention, the surface with the reflection particles is open upwardly and is not covered over by a transfer tape.

As a result the invention provides a method which is particularly economical for the production of large-scale series and with attractive reflecting properties.

Advantages of the inventive concept of creating the colored print image by means of offset printing or digital printing compared with screen printing are in particular reduced consumption of colorants required for the creating the colored print image (which can e.g. have a thickness of 3.5 μm), availability of low-cost offset printing plates, dispensability of printing plates and screens for digital printing, enhanced process speed for the computer to plate production, low changeover-times required for proceeding to different designs of the colored print image, finer print raster and dramatically enhanced printing speed.

The at least one reflection layer can be applied directly onto said colored print image. In further embodiments, the at least one reflection layer can also be applied onto an additional (typically transparent) primer/undercoat which may improve the reflection properties.

In an embodiment, a primer or intermediate layer is applied to the transfer adhesive after application of the transfer adhesive to the base medium area and prior to application of the colored print image. Such a primer or intermediate layer—although being optional—serves to support the subsequent offset printing of the colored print image. The primer or intermediate layer is typically white, but can also be colored or transparent. Further, the primer or intermediate layer can be applied over the full surface area involved or can alternatively be applied—like the transfer adhesive—such as to form a motif. The thickness of the primer or intermediate layer can be (without the disclosure being limited thereto) in the range of between 10 μm and 100 μm.

The application of the (preferably white) primer can be realized either directly onto the transfer adhesive or onto an additional intermediate layer, in particular onto a barrier layer or sublimation stop, which will then finally be provided between the adhesive layer and the primer.

In an embodiment said transfer adhesive is applied such as to form a motif, wherein said motif is effected in correct left-to-right (i.e. correct-side) and non mirror-image relationship. In further embodiments, the transfer adhesive can also be effected over the full surface area.

In an embodiment that said primer is also applied such as to form said motif. In further embodiments, the primer can also be effected over the full surface area.

In an embodiment creation of the colored print image is effected over the full surface area. This simplifies the offset printing process and makes use of the fact that any portions of the offset colorant protruding beyond the desired motif (and therefore not overlapping with the transfer adhesive) are anyway removed later during the removal of the base medium.

In an embodiment the application of the transfer adhesive to the base medium is effected in a screen print process. In further embodiments, the transfer adhesive can also be applied to the base medium by means of any other suitable process, e.g. an extrusion process, a suitable coating process or in any other fashion.

In an embodiment the application of the reflection layer is effected in a screen print process. Furthermore, the reflection layer can also be applied over the full surface area.

In an embodiment the application of the primer is effected in a screen print process.

If in an embodiment the transfer adhesive as well as the optional primer are applied over the full surface area as already mentioned above, and if also the reflection layer is later applied over the full surface area or partially on the colored print image, it is also possible to cut a motif into the layer structure produced. This step of cutting a motif can either be effected in correct-sided (i.e. correct left-to-right) relationship or, after removal of the base medium and applying a transfer tape, in mirror-image relationship (i.e. directly into the transfer adhesive and through all layers except for the tape).

In an embodiment and before application of the colored print image, the application of the transfer adhesive to the base medium is effected for a plurality of sheets, wherein said sheets are subsequently dried.

In an embodiment the method further comprises the step of applying a transfer tape.

In an embodiment the method further comprises, after the step of applying a transfer tape, the step of removing the base medium such that only the part of the colored print image that overlaps with the motif formed by the transfer adhesive remains on the transfer tape.

In an embodiment the method further comprises the step: applying the transfer, after removal of the base medium, and using pressure or heat, to a substrate.

In an embodiment the reflection particles are raised above the surface of the hardened reflection layer.

In an embodiment after application of the reflection layer a reflective glitter ink is applied on said reflection layer.

In an embodiment, the transfer adhesive is applied such as to form both a first motif and a second motif, the primer is applied such as to form only the first motif and the reflection layer is applied such as to form only the second motif, wherein the first and second motif are different from each other.

In such embodiments, also different motifs (such as e.g. two different texts, such as e.g. "love" and "hate" can be created at the step of printing the transfer adhesive, which can in this embodiment be transparent. Then, the primer is applied only onto one of the motifs, such as e.g. the word "love". Then, the colored print image by means of offset printing or digital printing can be either be created only on the primer or can be applied over the full surface area, but will in this case only remain on the primer. Afterwards, the reflection layer (which in this embodiment can also be transparent) is only applied to the second motif, such as in the above example the word "hate". In effect, at daylight view, only the word "love" will be visible, whereas upon illumination with flashlight only the word "hate" will be visible.

In an embodiment, the method further comprises the following steps:
sewing the transfer, after removal of the base medium, onto a textile substrate in such a way that a perforation defining a desired motif is produced,
removing the part of the transfer that is outside the motif defined by the perforation, and
permanently fixing the remaining part, having the motif, of the transfer to the textile substrate.

The step of permanently fixing the remaining part, having the motif, of the transfer to the textile substrate can in particular be realized using a transfer press for permanent fixing and by means of heat and/or pressure, wherein pressing can e.g. be done for a period of between 5 and 20 seconds at a temperature of between 120 and 180° C.

In this embodiment, the transfer adhesive preferably is of a strength sufficient for the sewing-on operation and in particular on the one hand should not be too soft in order to prevent it from sticking to the needle which is used during the sewing-on operation and which heats up the adhesive in the upward and downward movement. Optionally for that purpose the transfer adhesive can be provided with reinforcing particles. On the other hand the transfer adhesive should not be too hard in order still to permit the needle to pass therethrough without any problem and to allow it to be subsequently torn off along the perforation line produced.

Furthermore, the transfer can be—in addition to its property of being activated by means of heat—be made self-adhesive in order to provisionally fix the transfer, after removal of the base medium, onto the textile substrate before sewing or stitching it onto the textile substrate.

The invention also relates to a reflection transfer, characterized in that it is produced by the following steps:
providing an adhesive-repellent base medium;
applying a transfer adhesive to the base medium;
creating a colored print image by means of offset printing or digital printing;
applying at least one reflection layer which contains a multiplicity of reflection particles on said colored print image; and
removing the base medium such that only the part of the colored print image that overlaps with the motif formed by the transfer adhesive is separated from the base medium.

The invention further concerns a textile product produced by a method according to the invention, in which case a textile substrate is adopted as the substrate.

In regard to preferred configurations and advantages of the reflection transfer film reference is made to the foregoing description in connection with the method.

Further configurations of the invention are to be found in the description and the appendant claims. The invention is described in greater detail hereinafter by means of embodiments by way of example illustrated in the accompany drawings.

BRIEF DESCRIPTION OF THE DRAWINGS

FIG. 8A-8E are schematic views to illustrate a different possibility of use of a reflection transfer according to the invention;
FIG. 11A-11K are schematic illustrations to visualize the variety of designs and effects that can be obtained according to the present invention.

DETAILED DESCRIPTION OF INVENTION

Figure 1:
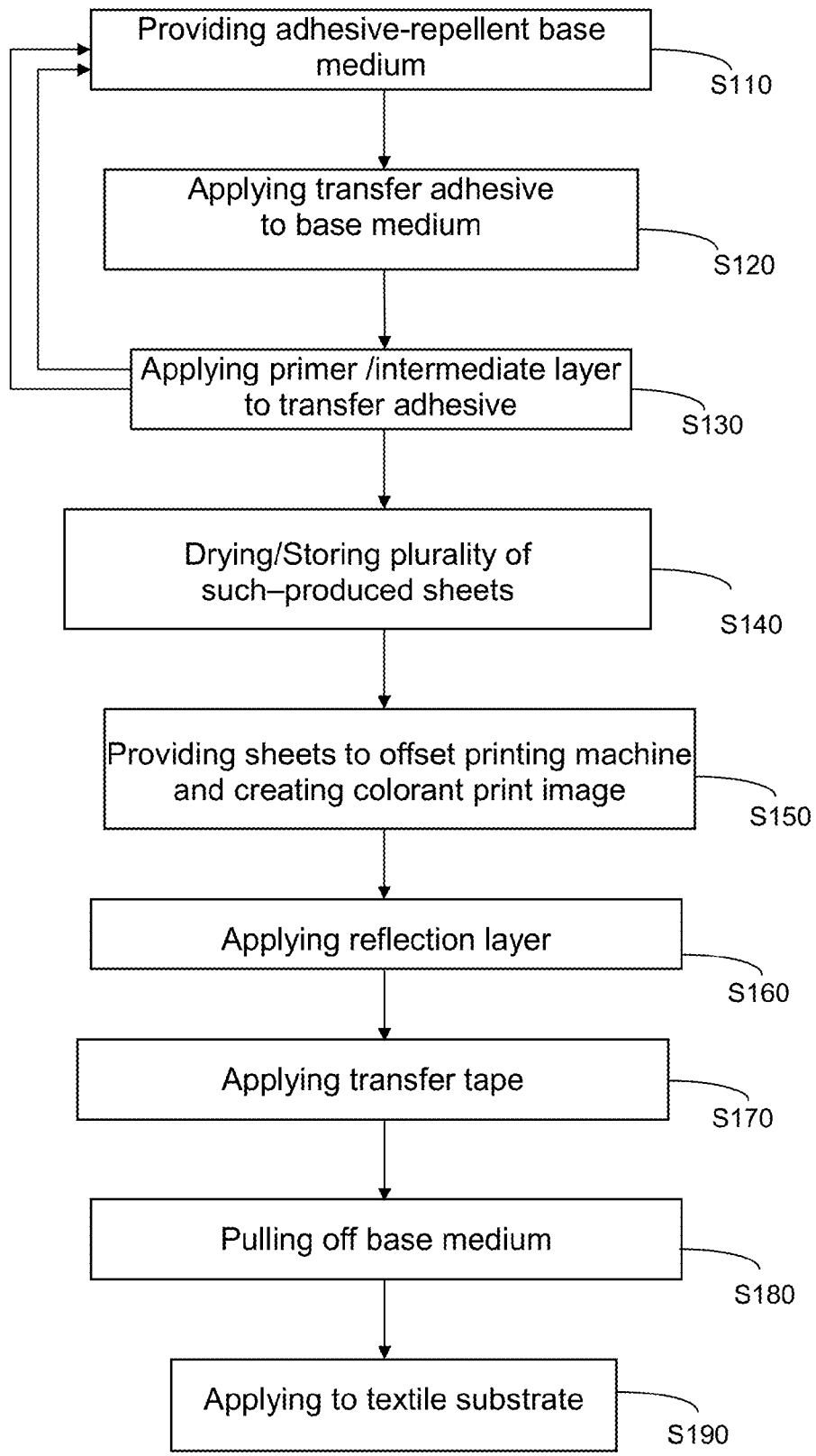
FIG. 1 shows a flow chart to illustrate a method according to an embodiment of the present invention.

Hereinafter a preferred embodiment of the method according to the invention is described with reference to the flow chart shown in FIG. 1 and the diagrammatic views in FIG. 2-7 serving for illustration purposes.

In the preferred embodiment explained in the following, in a step S110 an adhesive-repellent base medium 205 is provided, which for example can be made of an adhesive-repellent polyester or paper material. The "adhesive-repellent" property of the base medium 205 is in that respect preferably to be interpreted as meaning that the adhesive firstly binds well to the base material of the base medium 205 and can be deposited thereon in bubble-free and homogenous relationship, in which respect the adhesive can then be later detached from that base material 205 without any problem and in destruction-free fashion.

Figure 2A:
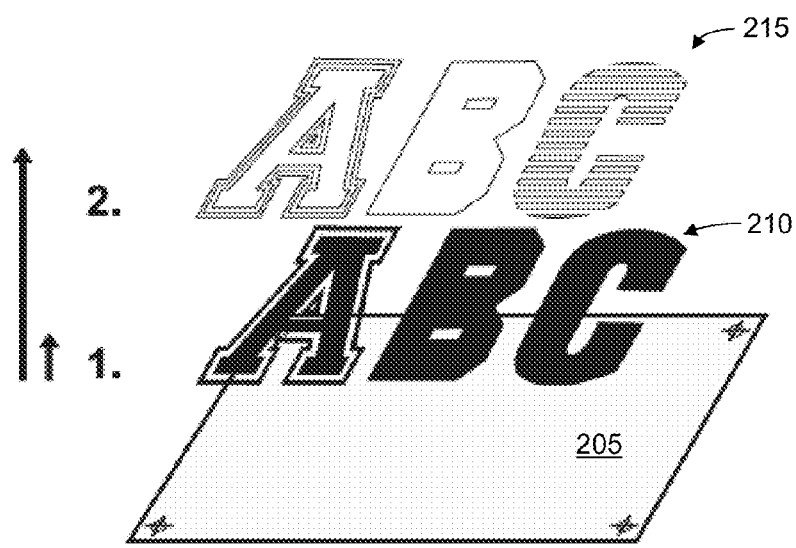
FIGS. 2A-2B show diagrammatic views to illustrate a separate stage of the method in the embodiment of FIG. 1.

A transfer adhesive 210 is applied to that base medium 205 (step S120) such as to form a motif, wherein said motif is effected in correct left-to-right relationship as schematically illustrated in FIG. 2a. The application of the transfer adhesive 210 to the base medium 205 in step S120 is effected e.g. in a screen print process (as described in EP 1 137 546 B1). A suitable transfer adhesive 210 is for example a thermoplastic co-polyester hot melt adhesive film. Aqueous adhesives, plastisol adhesives, solvent adhesives, polyurethane adhesives etc. are also suitable.

Subsequently, after drying the transfer adhesive 210, in an optional step S130, a primer or intermediate layer 215, respectively, is applied on the transfer adhesive 210, which in the preferred embodiment is a white layer that supports the later application of offset colorants when offset-printing a colored print image as further described below. A suitable primer (without the invention being limited thereto) is e.g. given by a plastisol screen printing ink commercially available under the name Epic TFX Lithoprint White from the company Wilflex, USA.

In a further embodiment, such a white layer supporting the later application of offset colorants can have adhesive properties and therefore, at the same time, also have the function of the transfer adhesive, i.e. the functionalities of the primer or intermediate layer 215 and of the transfer adhesive 210 can be realized in one and the same layer. Such a layer is also regarded as transfer adhesive 210 in the meaning of the present application.

In further embodiments, an additional intermediate layer which serves as a barrier or sublimation stop can be provided between the adhesive layer and the (preferably white) primer. A suitable additional intermediate layer (without the invention being limited thereto) is e.g. commercially available under the name 10545UB Underbase Gray from the company Wilflex, USA.

The primer or intermediate layer 215 is also dried.

Figure 2B:
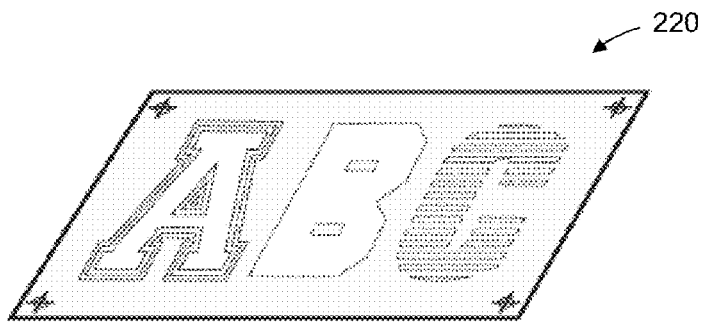

The layer stack that has been produced in the afore-described steps S110-S130, which is schematically illustrated in FIG. 2b (designated with "220"), is then dried. Further, preferably a multiplicity of such produced intermediate products or layer stacks 220 is collected or stored (step S140) before proceeding with the subsequent production steps that are described in the following with reference to FIG. 3*ff*. The afore-described production of a plurality of sheets for storage in advance of the offset printing process enables to make maximum use of the relatively high production speed that is basically made possible for the subsequent step of applying the at least one reflection colorant in an offset printing or digital printing machine. Further, the afore-described production of a plurality of sheets for storage in advance of the offset printing process enables to create a great variety of different reflective designs such as e.g. free standing designs, transfer foils for creating motifs by plotter cutting, hand cutting, laser cutting, embossing or stitching.

Figure 3A:
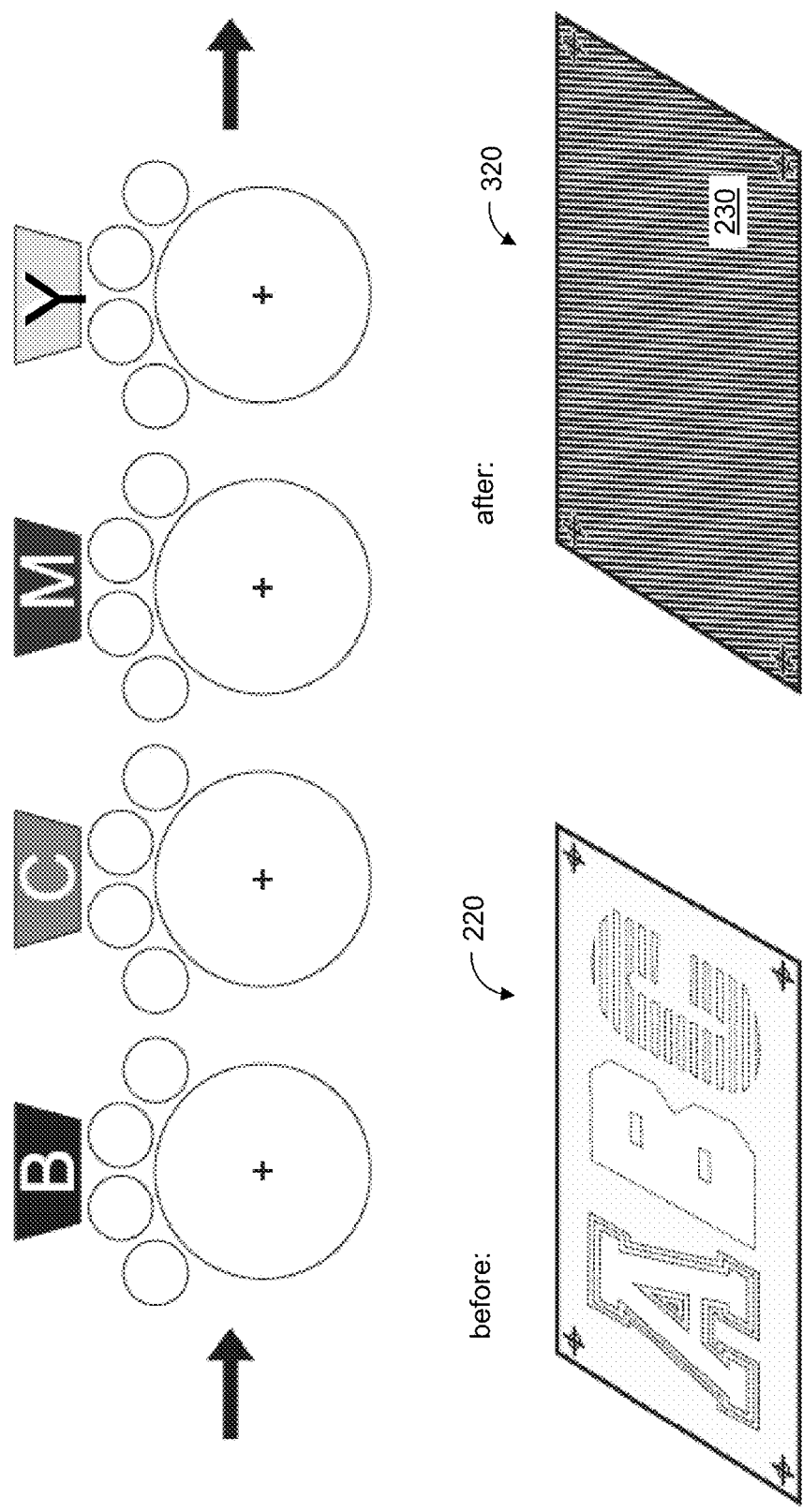
FIG. 3A-3D show diagrammatic views to illustrate a separate stage of the method in the embodiment of FIG. 1.
Figure 3C:
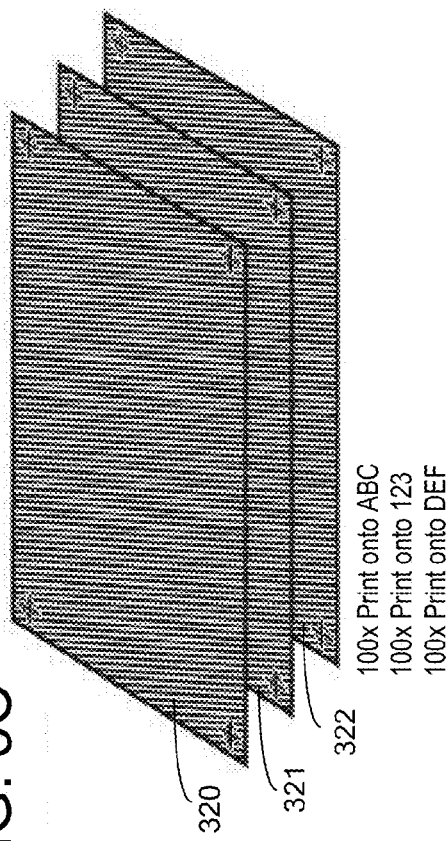
Figure 3D:
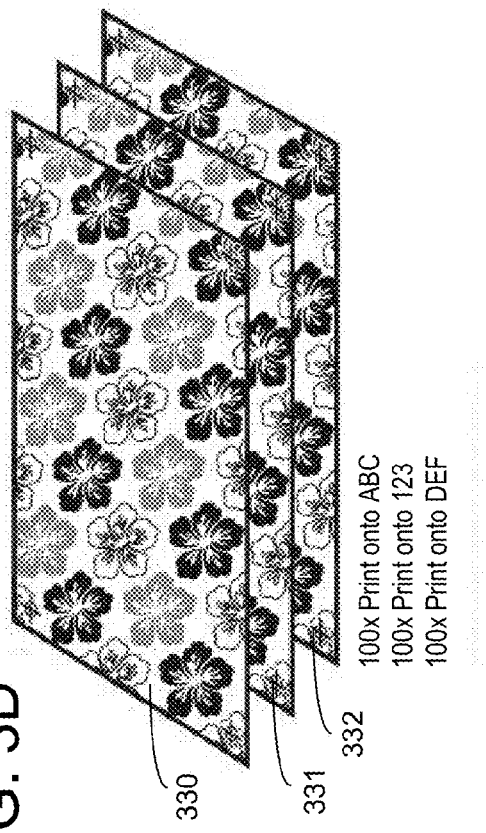

FIG. 3*a* shows how the stored intermediate products or layer stacks 220 are, after drying and storage, at the desired time and in the order and frequency as desired delivered e.g. to an offset printing machine for applying the respective colorants (step S150). In this offset printing process, the colored print image to be created is separated/rastered into the basic colors of the colorspace (black, cyan, magenta and yellow), and the respective offset colorants are subsequently applied in the offset printing machine as schematically shown in FIG. 3*a*. The resulted intermediate product 320 has the offset colorants forming the colored print image 230 on top of the primer/intermediate layer 215. The offset colorants are oxidative drying (i.e. they dry with air or hot air). Suitable offset colorants are e.g. given by Texlith inks commercially available from Sun Chemical Screen, UK.

Figure 3B:
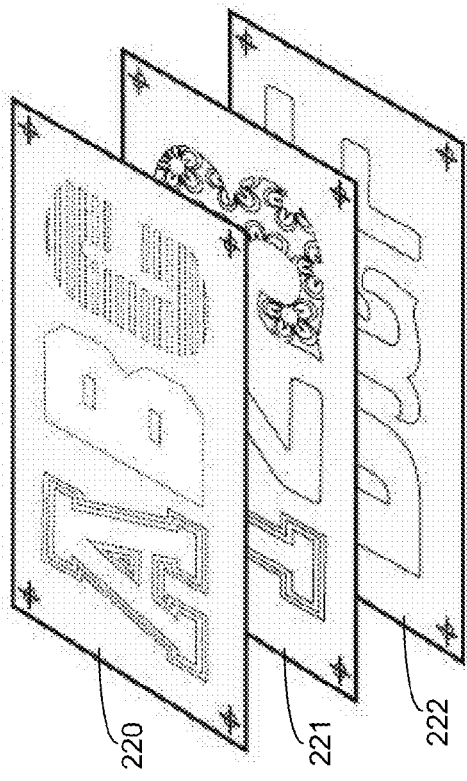

Changing the printing plates of the offset printing machine allows to produce different print designs onto the intermediate products or layer stacks 220 (comprising the transfer adhesive and the primer or opaque white applied before onto the adhesive-repellant base medium). In order visualize the variety of different designs that can be produced, FIG. 3*b* shows different intermediate products 220, 221, 222 before the offset or digital printing step (wherein for example three hundred sheets including the motif "ABC", three hundred sheets including the motif "123" and another three hundred sheets including the motif "DEF" are prepared). According to FIG. 3*c*, hundred intermediate products for each of said motif groups can be printed with a first design, whereas according to FIG. 3*d*, another hundred intermediate products of each of said motif groups are provided with a second design in the offset or digital printing step. The respective intermediate products achieved after said offset printing steps are designated with 320, 321 or 322 in FIG. 3*c* or 330, 331, 332 in FIG. 3*d*, respectively.

It is to be noted again that, as a result of the inventive inversion of the order of method steps compared with conventional offset transfer systems, the time window which has been discussed above and the accompanying restrictions to the manufacturing process are eliminated.

In the illustrated embodiment, the offset printing is effected over the full surface area of the layer stack 220, which simplifies the offset printing process and makes use of the fact that—in a later stage of the process—only the portions of the offset colorants that overlap with the transfer adhesive 210 and therefore with the motif remain on a transfer tape being used (as further described below). The invention is however not limited to the application of the offset colorants over the full surface area of the layer stack 220, so in other embodiments the application of the offset colorants in the offset printing machine can also be restricted to those regions where the motif has been produced (i.e. in the regions of the transfer adhesive 210).

In further embodiments, the colored print image 230 can also be created using a digital printing machine, typically for production of smaller quantities. Suitable machines are e.g. inkjet printing machines such as Mimaki JV 3 printer, Roland Eco Solvent printer or HP 5000/5500 wherein a suitable digital printer ink is e.g. commercially available under the name "streamline" from the company Coates Screen. A further suitable digital printing machine is e.g. HP indigo 7000 digital press.

Figure 4A:
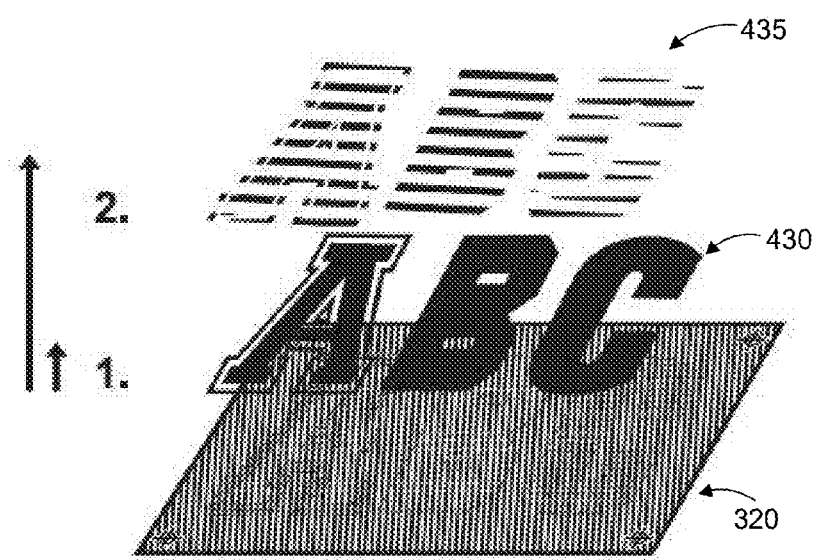
FIG. 4A-4C show diagrammatic views to illustrate a separate stage of the method in the embodiment of FIG. 1.
Figure 4B:
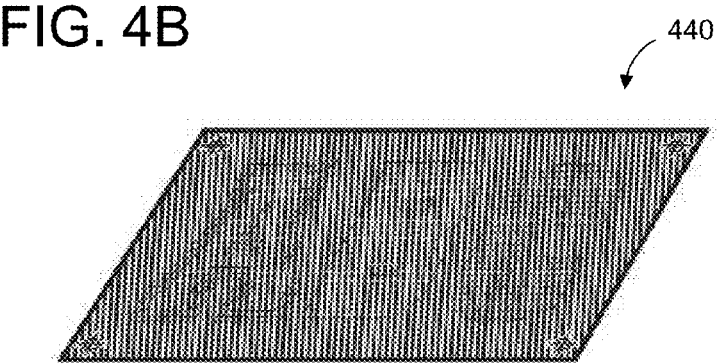
Figure 4C:
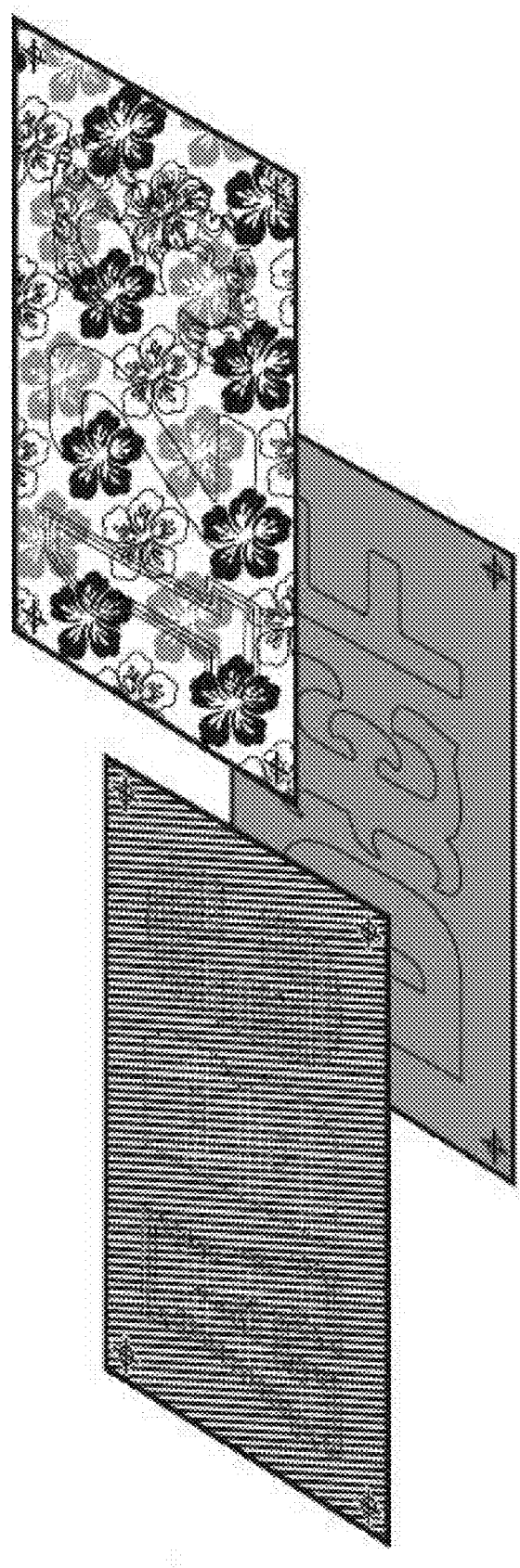

In a next step (S160), as schematically shown in FIG. 4*a*, a reflection layer 430 is applied to the colored print image 230 that has been produced in the offset printing process of FIG. 3 or on the intermediate product 320, respectively. The reflection layer 430 contains a multiplicity of reflection particles (for example of a maximum size of 45 μm). Suitable reflection or glitter reflection inks are available from the company Transprint GmbH, Germany. Application of the reflection layer 430 to the colored print image 230 can be effected (similar to the earlier application of the transfer adhesive 210 and the optional primer or intermediate layer 215) in a screen print process as described in EP 1 137 546 B1. Furthermore, and optionally, a reflective glitter ink 435 may be applied to said reflection layer 430 in order to enhance the later sparkling effect. The stack layer or intermediate product 440 obtained after the screen printing process of FIG. 4*a* is schematically shown in FIG. 4*b*. FIG. 4*c* shows different results of the afore described screen printing step, wherein said screen printing of the reflection layer and the optional reflective glitter ink has been performed for the different intermediate products obtained before as described with reference to FIG. 3*c* and FIG. 3*d*.

It is to be noted that the above discussed inventive inversion of the order of the method steps compared with conventional offset transfers results in further advantages also in so far as an enhanced flexibility is obtained in the application of the reflection layer, which can be varied to achieve different reflecting effects, for one and the same intermediate product obtained from the offset printing step. Furthermore, the open surface of the reflection layer or offset colorant layer, respectively, provided by the inventive transfer makes it possible to apply further refinements such as e.g. flock layers or other effect pigmented inks.

Figure 5A:
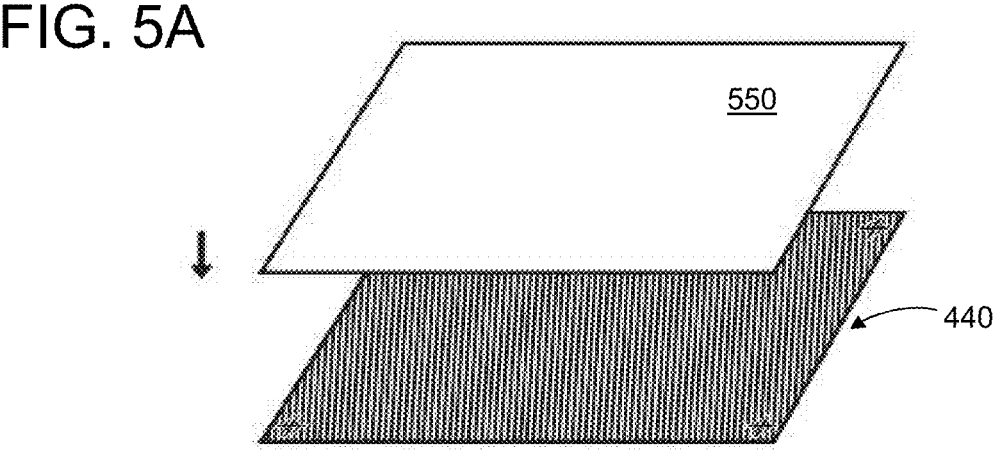
FIG. 5A-5C show diagrammatic views to illustrate a separate stage of the method in the embodiment of FIG. 1.
Figure 5B:
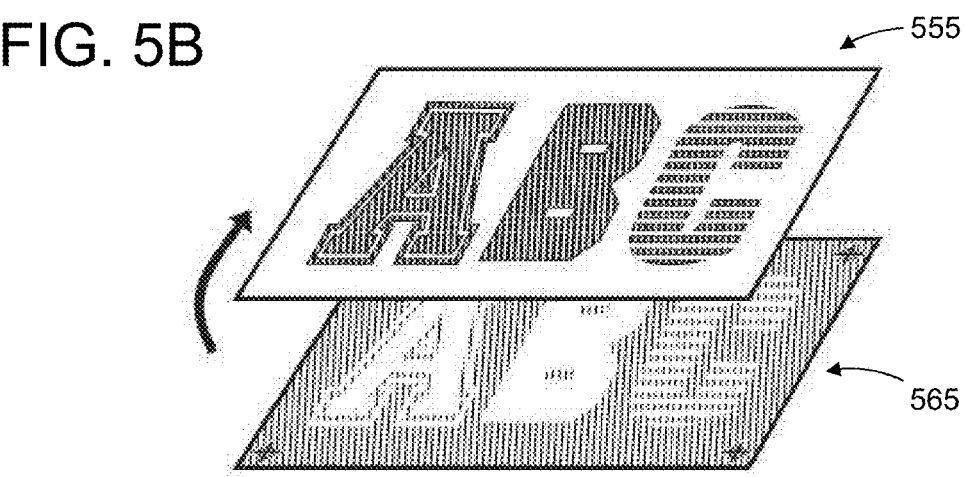
Figure 5C:
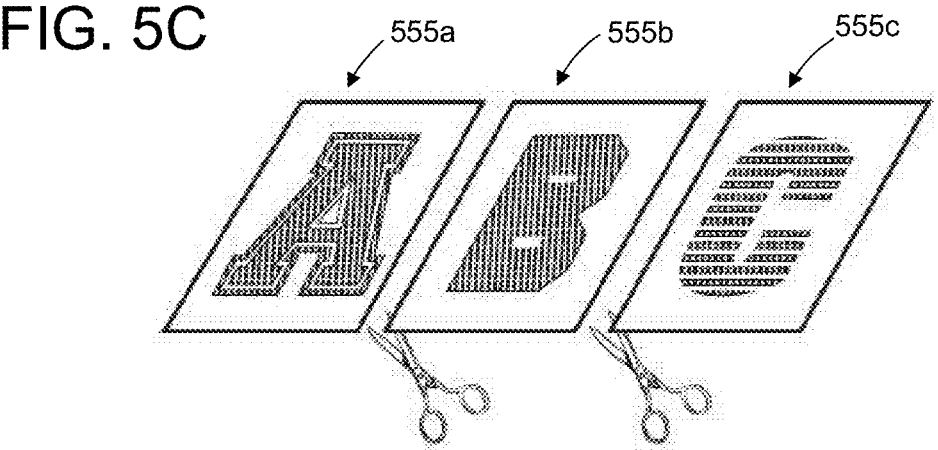

According to FIG. 5*a* and in a next step S170, a transfer tape 550 (which is self-adhesive) is applied to the stack layer or intermediate product 440, which can e.g. be done using a laminating machine in the form of a roller or a flat bed laminator. In other embodiments, the transfer tape 550 can also be applied manually. The transfer tape 550 should be such that it can be separated without residues after the transfer has been later fixed to the substrate.

Figure 6A:
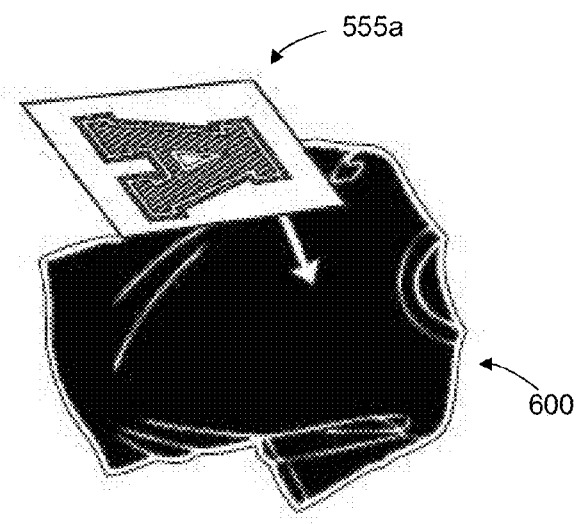
FIG. 6A-6B show diagrammatic views to illustrate a separate stage of the method in the embodiment of FIG. 1.
Figure 6B:
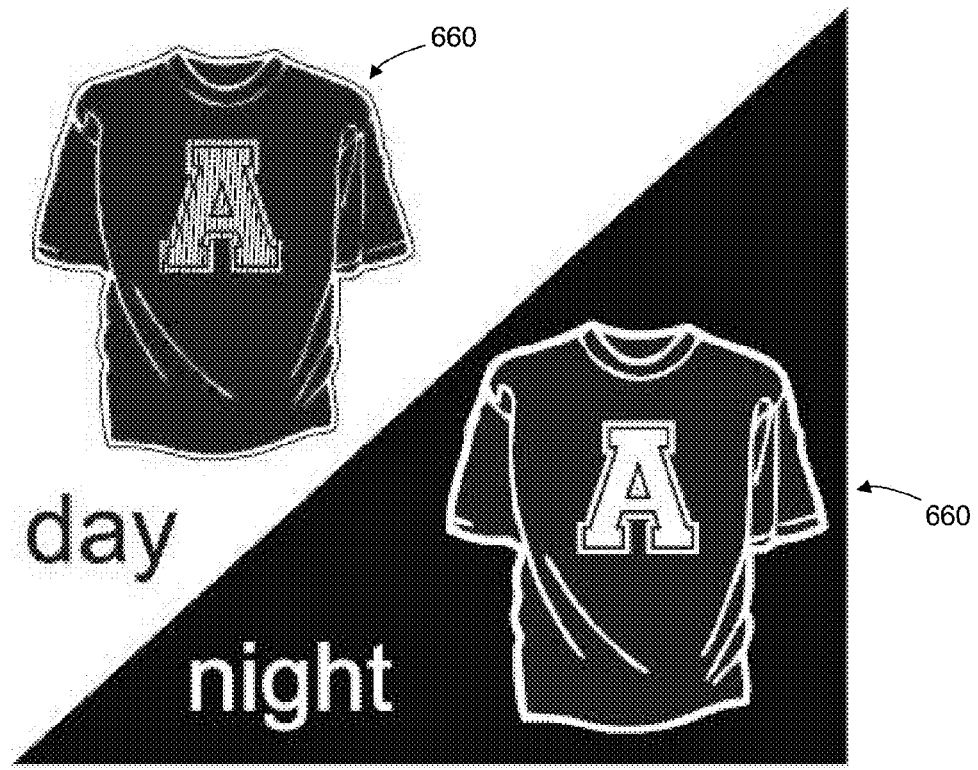

Removal of the base medium 205 is then effected in step S180 (see FIG. 5b), such that only the part of the colored print image 230 that overlaps with the motif formed by the transfer adhesive 210 (as well as by the optional primer or intermediate layer 215 and by the reflection layer 430) remains on the transfer tape 550. The "waste sheet" which is left is schematically shown as "565" and corresponds to the "negative" of the colored print image 230 created before. The finally produced reflection transfers 555a, 555b, 555c that exhibit the respective created motif (letters "A", B" or "C" in the present embodiment), the colored print image 230 as well as the produced reflective properties due to the reflection layer 430 can than be separated as appropriate or desired (see FIG. 5c), be applied as shown in FIG. 6a to a textile substrate 600 (step S190) and pressed thereto for example by means of a transfer press by means of heat and/or pressure. A smoothing iron can also be used for that purpose in a domestic situation. Finally the transfer tape 550 is pulled off so that the exposed motif 660 remains on the textile substrate 600 (FIG. 6b).

The final motif that has been transferred onto the substrate 600 exhibits the motif (in the example the letter "A" produced in the screen printing process when applying the transfer adhesive), the created colored print image 230 (by means of the offset printing or digital printing process) as well as the reflective properties due to the application of the reflective layer 430. Dependent on the extent of application of the reflection layer 430, illumination may result either in total or in only partial visibility of the colored print image 230.

Figure 12:
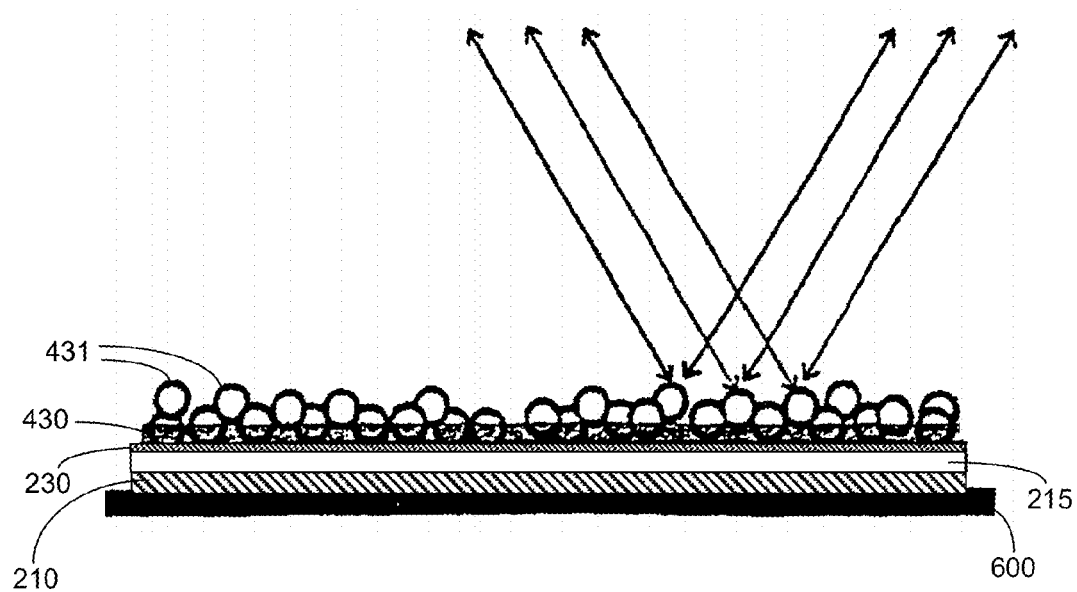
FIG. 12 shows a diagrammatic view to illustrate, in a side view, the effect of a reflection transfer according to the invention after applying the same on a substrate.

FIG. 12 shows a diagrammatic view to illustrate, in a side view, the effect of a reflection transfer according to the invention after applying the same on the substrate 600. The reflection particles 431 in the reflection layer 430 that has been applied on the colored print image 230 are raised above the surface and provide attractive reflecting properties obtained when the colored print image 230 is illuminated. Further, the reflection transfer enables, as explained before, a very fast economic and large-scale production due to the inventive involvement of the offset printing process.

As already mentioned before, the application of the transfer adhesive, as well as the application of the primer, can be performed either as to form a motif (as has already been described with reference to FIGS. 2-6) or over the full surface area. The latter approach, as well as different design options resulting from the before mentioned flexibility, will now be described in the following with reference to FIG. 7. Where appropriate, comparable or analogous components/layers have been designated by reference signs that were increased, compared to the reference signs of FIG. 2ff, by "500" (i.e. the adhesive-repellant base medium 205 of FIG. 2a became the adhesive-repellant base medium 705 in FIG. 7a, etc.).

Figure 7A:
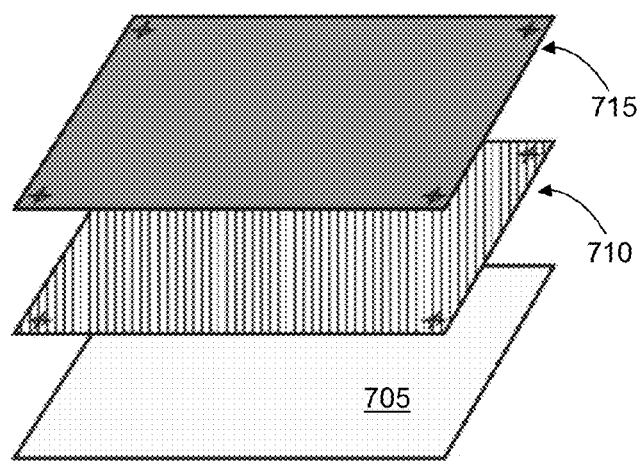
FIG. 7A-7I are schematic views to illustrate separate stages of a method according to a further embodiment of the present invention.

In a first step schematically shown in FIG. 7a, transfer adhesive 710 and (opaque white) primer 715 are printed onto adhesive-repellant base medium 705 (e.g. made from paper or polyester) e.g. in a screen print process (as described in EP 1 137 546 B1). The opaque white primer 715 serves inter alia for the optimal reproduction of the later printed color spectrum.

Figure 7B:
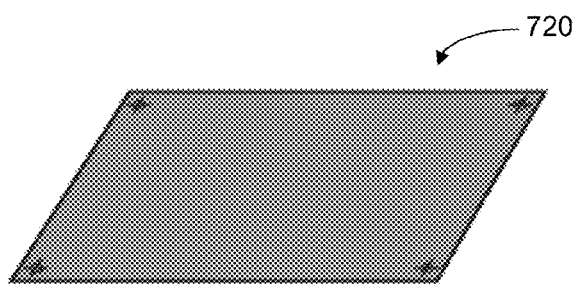
Figure 7C:
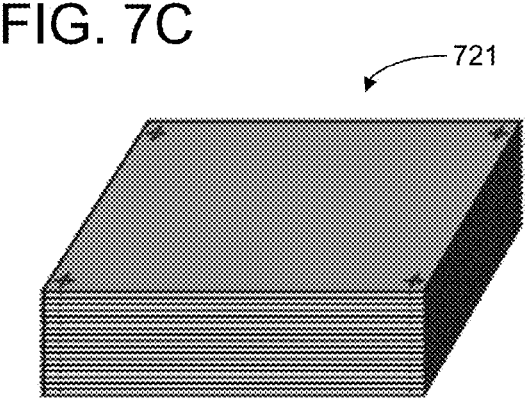
Figure 7D:
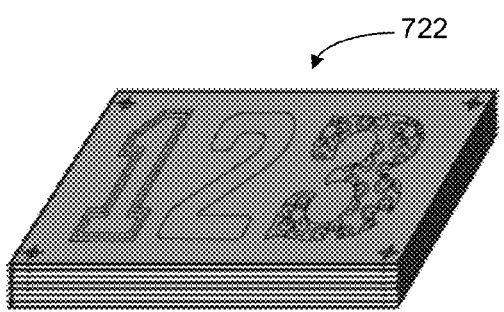

The result of the aforementioned screen printing is shown in FIG. 7b and designated with "720". As indicated in FIG. 7c, a layer stack 721 of such obtained sheets is produced and dried. FIG. 7d indicates the further option to produce layer stacks 722 having a cut of different designs which can be performed to facilitate the later process of releasing the transfer described further below.

Figure 7E:
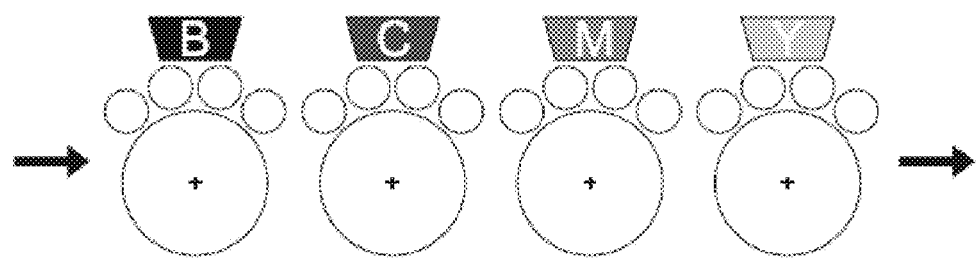
Figure 7F:
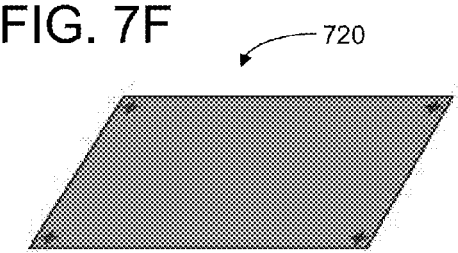
Figure 7G:
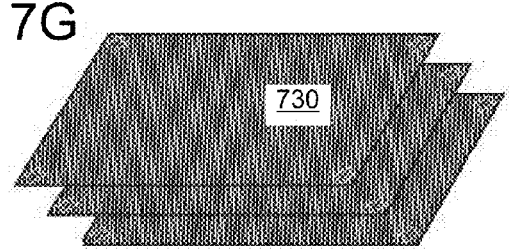
Figure 7H:
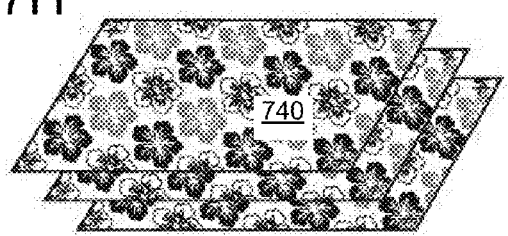
Figure 7I:
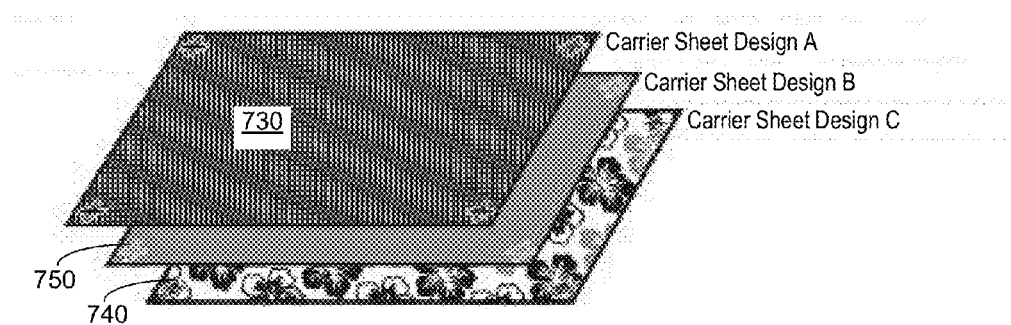

In a next step illustrated in FIG. 7e, and analogously to the above description of FIG. 3, offset printing or digital printing is performed in order to cover the aforementioned sheets of stacks 721, 722ff. with offset colors (or digital printer ink colors, respectively). While FIG. 7f again shows the sheet 720 before the offset (or digital) printing, FIGS. 7g, 7h and FIG. 7i indicate that by changing the printing plates of the offset printing machine, different print designs (leading to different intermediate products 730, 740, 750, . . . ) can be produced in this offset printing or digital printing step.

Figure 7J:
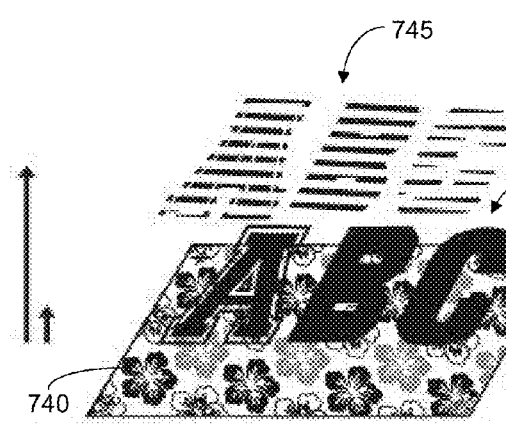
Figure 7K:
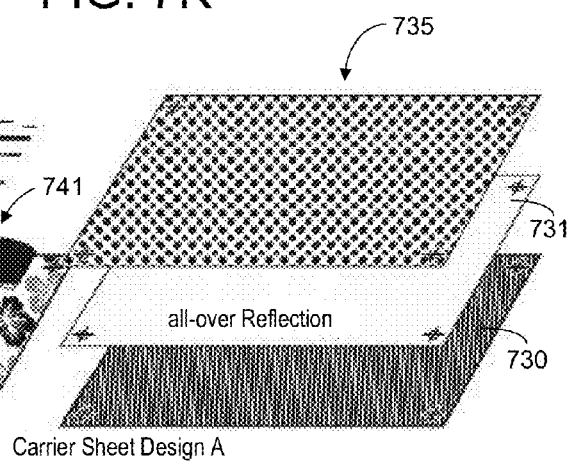

Afterwards, as indicated in FIG. 7j for intermediate product 740, a reflection layer 741 as well as an optional reflective glitter ink 745 are applied, again in a screen printing process, onto the intermediate product that has been obtained at the end of the offset printing (or digital printing) process. Here, the reflective ink (containing a multiplicity of reflection particles as has already been described before with reference to FIG. 4a) can be printed all-over the surface of the respective intermediate product (as illustrated in FIG. 7k) or only partially (as indicated in FIG. 7j), which again allows, in combination with the subsequent optional reflective glitter ink 735, 745ff, production of different designs having different reflective effects (for which only an exemplary and schematic illustration is given in FIG. 7l).

As described in the following with reference to FIGS. 8-10, different possibilities of further use exist for the produced printed carrier sheets of FIG. 7l.

Figure 7L:
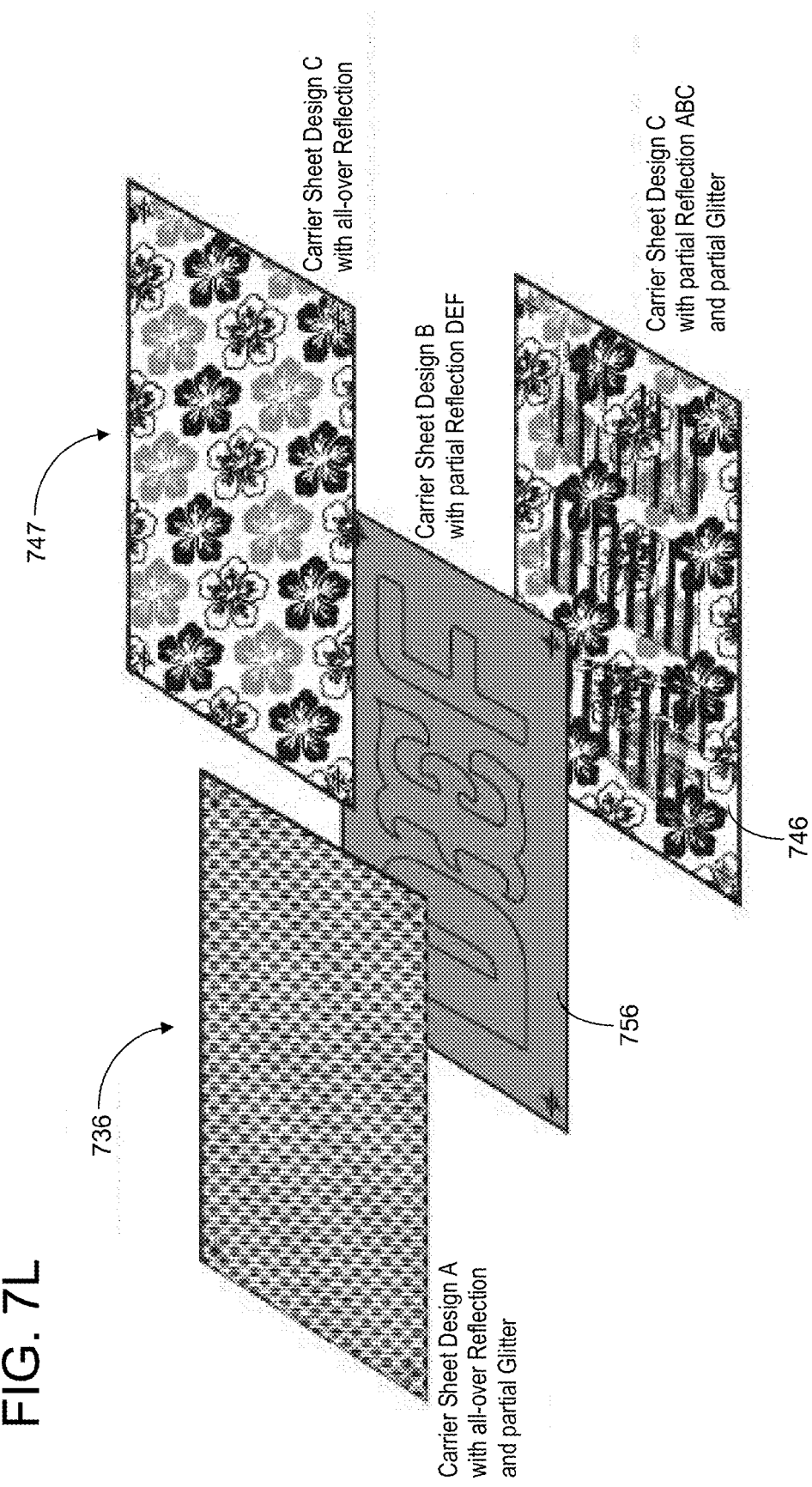

In a first possibility of use, which is indicated in FIG. 8a-8e for the example of printed carrier sheet 736 of FIG. 7l (comprising an all-over reflection layer and a partial glitter ink layer), a transfer tape 850 is laminated (as schematically indicated in FIG. 8b) all-over onto the printed carrier sheet 736, after which the adhesive-repellant base medium or carrier is removed and a plot design (as schematically shown in FIG. 8c) is cut into the obtained plot foil from the reverse or back side in a mirror-inverted way. After a removing or weeding step shown in FIG. 8d, the resulting transfer (FIG. 8e) is ready to be placed and heat-transferred onto a textile substrate.

Figure 9A:
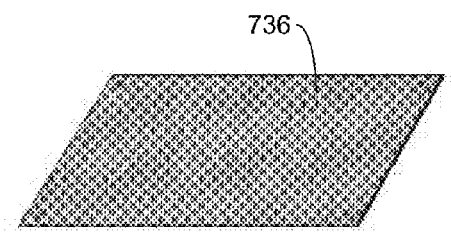
FIG. 9A-9C are schematic views to illustrate a different possibility of use of a reflection transfer according to the invention.
Figure 9B:
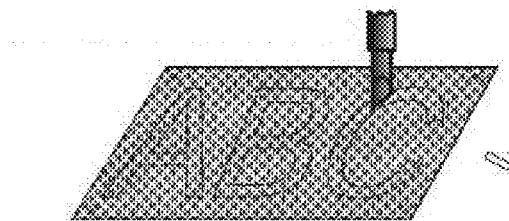
Figure 9C:
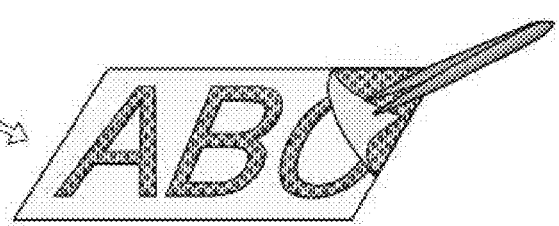
Figure 10A:
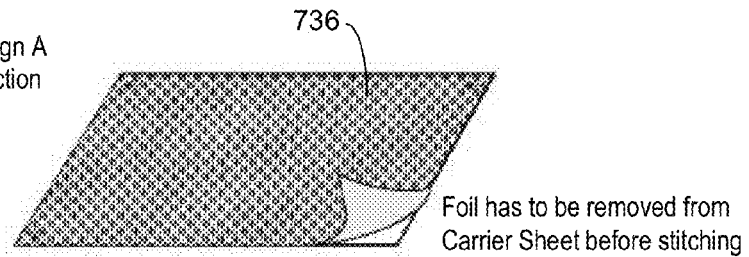
FIG. 10A-10B are schematic views to illustrate a different possibility of use of a reflection transfer according to the invention.
Figure 10B:
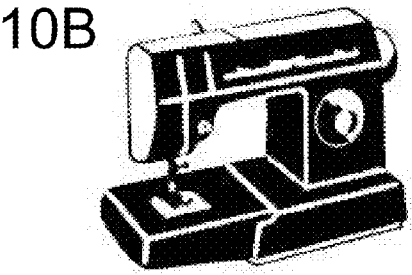

In an alternative possibility of use schematically shown in FIG. 9a-9c, the printed carrier sheet 736 (see FIG. 9a) can also be treated in a plotting or laser cutting process (FIG. 9b) with the reflection layer facing up, i.e. by cutting the desired plot design from the front side and in a correct left-to-right relationship. The so obtained, ready-cut transfer can be detached with a tape and is ready for transferring onto a textile substrate.

In a further possibility of use which is only schematically shown in FIGS. 10a and 10b again for the printed carrier sheet 736, also a stitching process can be used after removing the transfer adhesive base layer or carrier, wherein the transfer is stitched onto a textile substrate as indicated in FIG. 10b. Here, it is in particular possible to sew the transfer, after removal of the base medium, onto a textile substrate in such a way that a perforation defining a desired motif is produced, wherein this perforation can in particular be already sufficient in order to permit a manual removal of the part not belonging to the desired motif.

FIG. 11a-k serve to additionally visualize the large variety of design possibilities and achievable effects of the inventive transfers after application onto a textile with or without illumination.

Figure 11A:
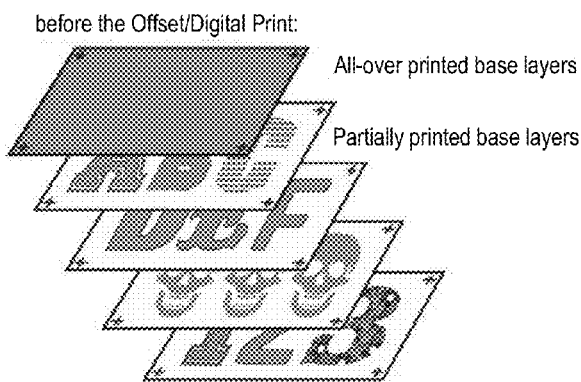
Figure 11B:
Figure 11C:
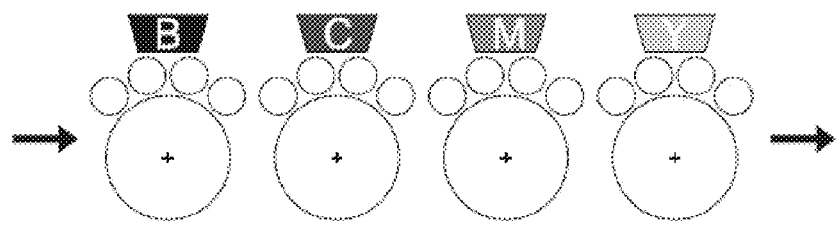
Figure 11D:
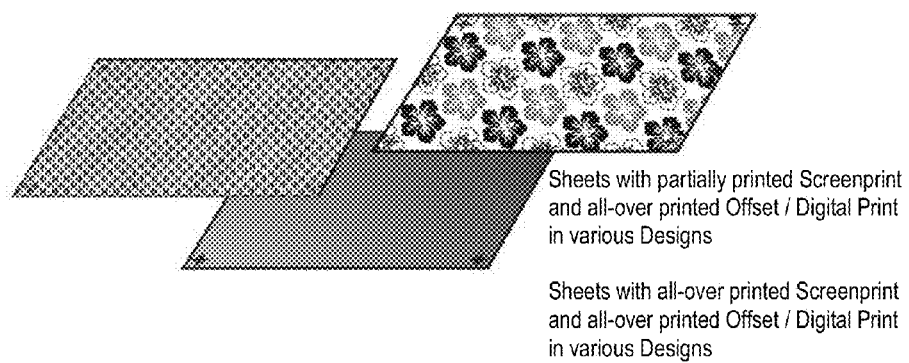
Figure 11J:
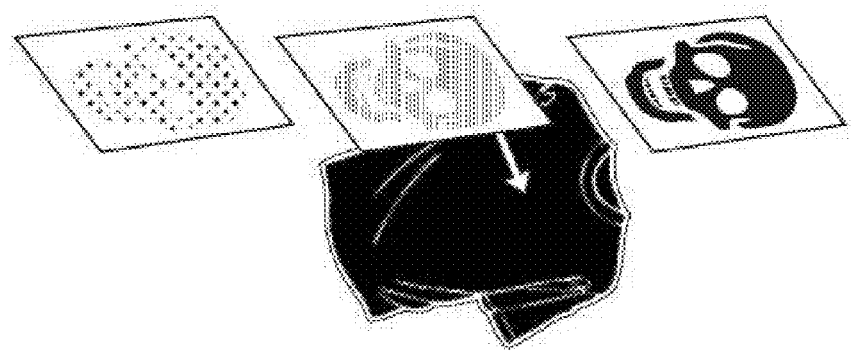
Figure 11K:
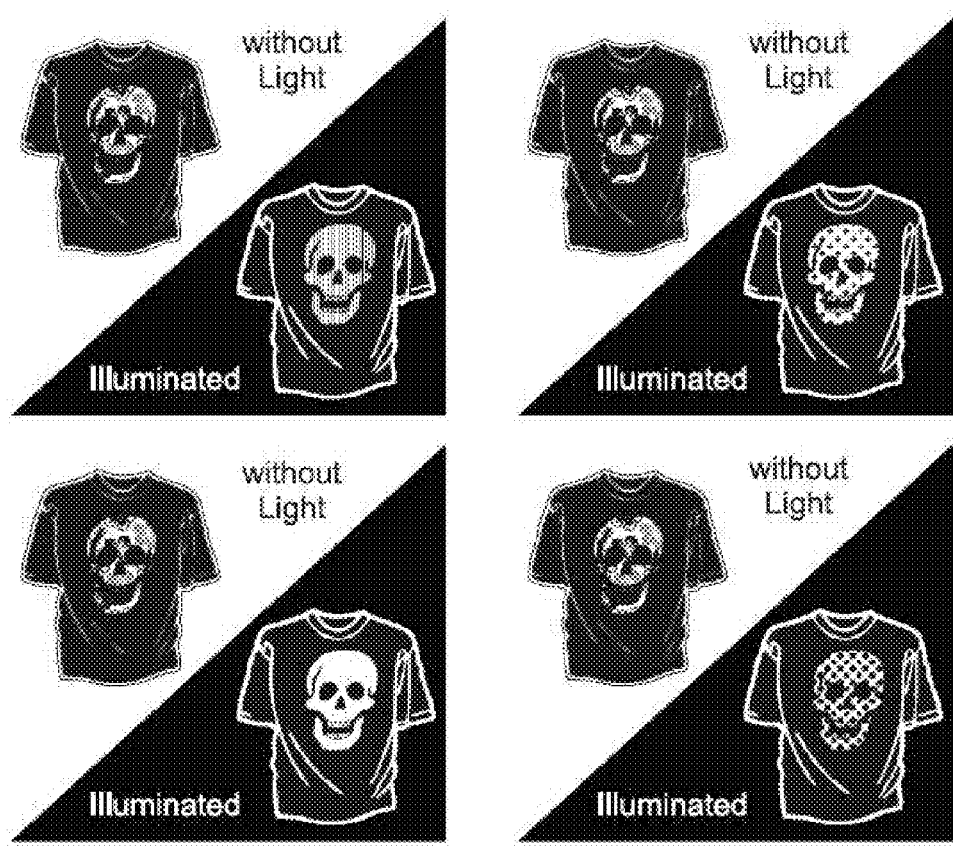

FIGS. 11a and 11b once more assemble several variously (all-over or partially) printed carrier sheets, which can be sorted and stacked (FIG. 11b). Again, it is important to note the possibility of storage production of large numbers of sheets, which can be dried and stored (if desired for several weeks) in order to afterwards take maximum benefit of the production capabilities of the offset printing machine (FIG. 11c). As a result of the offset printing (or digital printing) process, sheets with either partially or all-over screen-printed transfer adhesive and primer are provided with various designs depending on the respective used printing plate of the offset printing machine (FIG. 11d). The such obtained offset printed (or digital printed) carrier sheets, such as e.g. illustrated in FIG. 11e, are provided in the following screen printing process with reflective ink and optionally also glitter ink, wherein different reflective effects can be obtained depending on the printing of the reflective ink (which can again be made partially, see FIG. 11f-11h, or all-over, see FIG. 11i). After subsequent application of the transfer onto a textile substrate (FIG. 11j), different results and effects can be obtained, in particular depending on whether the textile is looked at without light or illuminated.

Even if the invention has been described by reference to specific embodiments numerous variations and alternative embodiments will be apparent to the man skilled in the art, for example by combination and/or exchange of features of individual embodiments. Accordingly it will be appreciated by the man skilled in the art that such variations and alternative embodiments are also embraced by the present invention and the scope of the invention is limited only in the sense of the accompanying claims and equivalents thereof.

The invention claimed is:

1. A method of producing a reflection transfer for transferring a motif onto a substrate, wherein the method comprises:
   a) providing an adhesive-repellent base medium;
   b) applying a transfer adhesive to the base medium, thereby forming a motif having a correct left-to-right relationship and forming an intermediate product;
   repeating said steps a) and b) to form a plurality of intermediate products;
   drying said plurality of intermediate products;
   c) creating a colored print image by offset printing or digital printing on the plurality intermediate products; and
   d) applying at least one reflection layer which contains a multiplicity of reflection particles onto the colored print image on the plurality of intermediate products.

2. A method as set forth in claim 1, wherein after step b), a primer is applied, wherein said colored print image in step c) is applied on said primer.

3. A method as set forth in claim 2, wherein said primer is white.

4. A method as set forth in claim 2, wherein said primer is also applied such as to form said motif.

5. A method as set forth in claim 2, wherein application of the primer is effected in a screen print process.

6. A method as set forth in claim 2, wherein the transfer adhesive is applied such as to form both a first motif and a second motif, the primer is applied such as to form only the first motif and the reflection layer is applied such as to form only the second motif, wherein the first and second motif are different from each other.

7. A method as set forth in claim 1, wherein creation of the colored print image in step c) is effected over a full surface area of each of the plurality of intermediate products.

8. A method as set forth in claim 1, wherein application of the transfer adhesive to the base medium is effected in a screen print process.

9. A method as set forth in claim 1, wherein application of the reflection layer is effected in a screen print process.

10. A method as set forth in claim 1, further comprising e) applying a transfer tape onto the colored print image of the plurality of intermediate products.

11. A method as set forth in claim 10, further comprising removing the base medium such that only the part of the colored print image that overlaps with the motif formed by the transfer adhesive is separated from the base medium and remains on the transfer tape.

12. A method as set forth in claim 1, wherein the reflection particles are raised above the surface of the hardened reflection layer.

13. A method as set forth in claim 1, wherein after application of the reflection layer a reflective glitter ink is applied on said reflection layer.

14. A method as set forth in claim 1, further comprising applying the transfer, after removal of the base medium and using pressure or heat, to a substrate.

15. A textile product produced in accordance with a method as set forth in claim 14, wherein a textile substrate is used as the substrate.

16. A method as set forth in claim 1, further comprising:
   sewing the transfer, after removal of the base medium, onto a textile substrate in such a way that a perforation defining a desired motif is produced,
   removing the part of the transfer that is outside the motif defined by the perforation, and
   permanently fixing the remaining part, having the motif, of the transfer to the textile substrate.

17. A reflection transfer, produced by the method of claim 1.

* * * * *